324-77
SEARCH ROOM

INVENTOR.
WESLEY E. DICKINSON
BY John H. Holcombe
ATTORNEY

United States Patent Office 3,450,989

Patented June 17, 1969

3,450,989
FREQUENCY ANALYZER FOR DETECTION OF ENERGY PEAKS

Wesley Edward Dickinson, San Jose, Calif., assignor to International Business Machines Corporation, Armonk, N.Y., a corporation of New York Filed Sept. 28, 1965, Ser. No. 490,834
Int. Cl. G01r 23/16
U.S. Cl. 324—77 5 Claims

ABSTRACT OF THE DISCLOSURE

Frequency analyzer capable of continuously tracking and identifying the frequencies of energy peaks (formants) of voiced speech sounds. A bank of frequency energy detectors are connected via automatic switching circuitry so as to be dynamically arranged in groups to provide a plurality of voltage outputs, each voltage output representing the frequency of one of the formants present in a given sample of speech.

Figure 1:
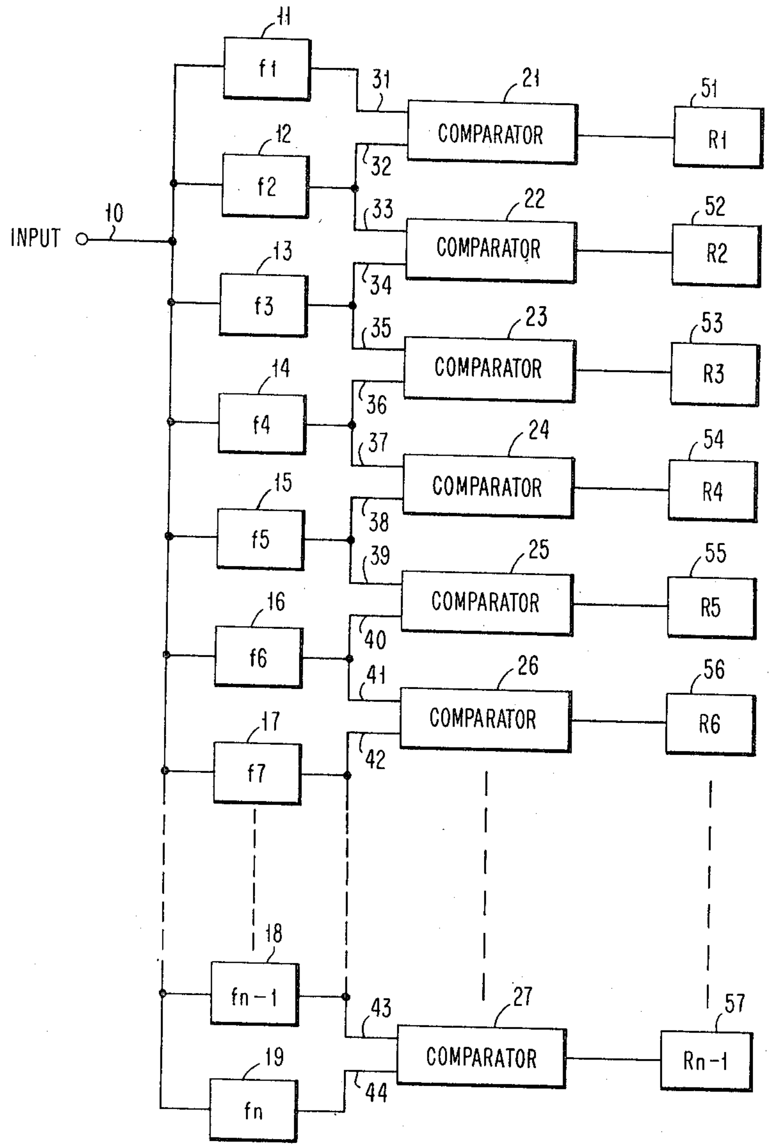

This invention relates to the analysis of electrical signals, and more particularly to apparatus for analyzing the frequency characteristics of electrical waveforms.

The analysis of electrical waveforms has been particularly applicable to the field of speech recognition. In apparatus or systems for analyzing and recognizing spoken words, the most widely used and generally accepted as the most invariant speech sound wave measurement is that of formant tracking.

Each pure phonetic sound, except some plosive sounds such as "k" or "s," comprises a series of substantially identical vocal wave patterns which are formed by a particular set of resonances in the vocal cavities. Movements of the jaw, tongue and lips control the instantaneous size of the vocal cavities and each vibration of the vocal cords produces a pressure wave of air which resonates in the momentarily formed cavities. Thus, the speech sound wave contains energy peaks at the resonance frequencies and these energy peaks are called formants.

The human brain recognizes a phonetic sound almost entirely on the basis of the three lowest frequency formants. Therefore, it is logical to say that the three lowest frequency formants comprise all the information necessary for phonetic sound analysis.

During voicing, these formants do not remain constant; rather, they are continually changing as the jaw, tongue and lips are moved. Thus, it is necessary to continuously track the three lowest frequency formants to obtain accurate voice recognition.

Further, while words are being voiced, the frequency ranges of the formants may overlap and particular formants may cross one another on the frequency scale. That is, the resonance cavity forming the lowest frequency formant F1 can become smaller while the resonance cavity forming the second formant F2 becomes larger until they reach the same frequency and cross. Thus, the formant produced by the second resonance cavity is now the lowest frequency formant and is called F1, while the first resonance cavity now forms the second formant F2.

This probability of formants overlapping or crossing obviously makes the separation and tracking of individual formants extremely difficult.

A number of approaches to continuous tracking of formants have been made. The objective of all approaches is to find the maximum energy peaks at each instant of time and to determine the resonance frequency of each such peak.

For example, apparatus has been provided for detecting the zero-axis-crossing frequency of the speech waveform and calling that an indication of the lowest frequency formant, and for detecting the slope-reversal frequency of the speech waveform and calling that the next lowest frequency formant. The resultant apparatus is simple, but in view of the number of formant frequencies comprising the complex speech signal, such apparatus often is inadequate.

A second example is the division of a bank of consecutively arranged band-pass filters into groups which are selected to cover the approximate ranges of the formants. A formant within each group is determined by detecting which filter within the group has the largest amplitude output. However, as described above, the frequency ranges of the formants overlap. Thus, such a system is inaccurate in many cases because it cannot discriminate formants in the overlap region.

Another example comprises apparatus for sequentially scanning a bank of consecutively arranged band-pass filters covering the frequency range of all formants of interest to thereby determine the peaks encountered. However, such apparatus is highly complex and causes errors due to the scanning time.

A few additional systems have been devised, but they also suffer from errors and inaccuracies similar to those described above.

Therefore, it is an object of the present invention to provide apparatus for continually tracking the maximum energy peaks of a changing, complex electrical signal.

Another object of the present invention is to provide apparatus to continuously find the maximum energy peaks of a complex, changing input signal for every instant of time and to determine the resonance frequency of each such peak.

Still another object of the present invention is to provide apparatus for continuously tracking the lowest frequency formants of voiced speech sounds.

A further object of the present invention is to provide means for obtaining automatic isolation of formant frequencies for each instant of time.

Therefore, in accordance with the present invention there is provided a frequency analyzer comprising an input, a serially arranged bank of frequency detectors connected to said input, each responsive to a selected one of a plurality of serially arranged frequency bands to provide an output representative of the instantaneous amplitude of the selected frequency band, a plurality of comparators, each connected to the output of a pair of neighboring frequency detectors, for detecting when the higher of the frequency detectors has an output of greater amplitude, a plurality of switching means, each associated with a comparator, operated by detection by the associated comparator, a plurality of voltage sources having sequentially arranged voltages, each connected to a terminal of an associated switching means, and circuit connections between the switching means arranged such that, when a switching means is operated, its associated voltage source is connected to the preceding switching means, and when a switching means is not operated, its associated voltage source is connected to the succeeding switching means, whereby the highest voltage in a group of so connected switching means is impressed on all the switching means of that group and is representative of the frequency detector having the highest frequency in that group.

Further, in accordance with the present invention, there is additionally provided logic means operated by the outputs of the comparators to determine which of the groupings of switching means represent respectively the lowest, middle and highest frequency energy peaks.

The foregoing and other objects, features and advantages of the invention will be apparent from the following more particular description of a preferred embodiment of the invention, as illustrated in the accompanying drawings wherein:

FIG. 1 is a block diagram of the frequency detectors, comparators and switching means of the present invention; and FIGS. 2 and 3A–E are diagrams comprising the switching means and logical network for deriving the energy peaks in accordance with the present invention.

Referring to FIG. 1, electrical signals comprising speech sound waves are received at input 10 and applied to a bank of frequency detectors 11 through 19, which are tuned to frequency ranges *f*1 through *fn* covering slightly more than the fundamental frequency range of speech sound waves. That is, frequency range *f*1 is chosen slightly below the lowest frequency of formant F1.

Each of the frequency detectors of the frequency detector bank may comprise an input ban-pass filter together with a demodulator. The filter limits the portion of the input signal transmitted therethrough to a certain specific frequency range and the demodulator converts the input signal into a voltage level indicative of the instantaneous mean energy of the received signal. The resultant output is therefore unaffected by the instantaneous values of the received sine wave and is representative of the mean of the energy contained therein. Thus, each of the frequency detectors is tuned to detect a narrow frequency band and provides an output voltage indicative of the total energy within the frequency band.

The frequency detectors are arranged so that the frequency bands detected by adjacent detectors are also adjacent and proceed from the lowest frequency band *f*1 consecutively through the highest frequency band *fn*. Therefore, the bank of frequency detectors analyzes a complex incoming voice signal and provides at the outputs thereto various voltages corresponding to the instantaneous energies of the voice signal at each of the detected frequency ranges.

The outputs of the frequency detectors are connected via inputs 31 through 44 to a bank of comparators 21 through 27. The comparators each comprise a difference detector which determines which of two inputs 31 and 32, etc., has the largest voltage, and a driver circuit which provides a high current output signal. The two inputs to each comparator are connected to the outputs of two adjacent frequency detectors so that it provides an output if the higher frequency detector is supplying an output of higher voltage than that of the lower frequency detector. Conversely, if the lower frequency detector is providing the higher output, the comparator is not activated.

For example, input 31 of comparator 21 is connected to the output of frequency detector 11, which covers the lowest frequency range *f*1. Input 32 to comparator 21 is connected to the output of detector 12 which represents the second lowest frequency, *f*2, which is the lowest expected frequency of formant F1. Thus, if the higher of the two frequency bands, *f*2, possesses more energy, the output of detector 12 is higher than that of detector 11. The input 32 to comparator 21 is then of a higher voltage level than input 31 so that the comparator provides an output.

The remaining comparators 22 through 27 are identical and are similarly connected via inputs 33 through 44 to frequency detectors 12 through 19. These comparators are similarly arranged and likewise provide an output when the detector covering the higher frequency band of the two adjacent detectors has a higher voltage output.

Therefore, constant comparisons are being made between each of the adjacent detectors over the entire frequency band being detected. The comparators below, but near, that of the first formant peak are therefore on since the voltage outputs of the detectors are increasing toward that of the detector containing the first formant frequency. Then, those detectors covering the frequencies above the first formant have decreasing voltages so that those comparators are off.

Also, those detectors approaching the second formant frequency have increasing voltages so that the associated comparators are on. Likewise, those comparators detecting the frequency detectors subsequent to the second formant frequency are off. Again, the comparators connected to the detectors preceding the third formant frequency are on and those subsequent are off.

Thus, the transistion progressing toward higher frequencies from a comparator that is ON to one that is OFF indicates a formant peak. For example, if a formant lies in the frequency range *f*4, comparator 23 is on while comparator 24 is off thereby providing the transition therebetween indicating that *f*4 contains the detected formant.

The transition between a comparator that is off and one that is on designates the low point which is not presently of significance in speech recognition.

The output of each comparator is connected to a corresponding one of a bank of relays 51 through 57. Therefore, each comparator determines which of two adjacent frequency detectors has the largest output and controls a relay accordingly.

For example, if *f*2 is larger than *f*1, indicating that the first formant is at *f*2 or above, comparator 21 is operated and its driver provides an output signal which picks relay 51. If comparator 21 is off, then *f*1 is larger than or equal to *f*2, indicating a level, or a falling, amplitude-frequency pattern and this does not indicate a formant peak.

Similarly, if relay 51 is on AND relay 52 is off, the indication is that the lower formant frequency is at frequency *f*2.

Therefore, relay 51 is also designated R1 to indicate that it responds to the comparison between frequency ranges *f*1 and *f*2. Likewise, R2 designates the relay responding to the frequency ranges *f*2 and *f*3, R3 designates the relay responding to the comparison between frequency range *f*3 and *f*4, etc.

Figure 2:
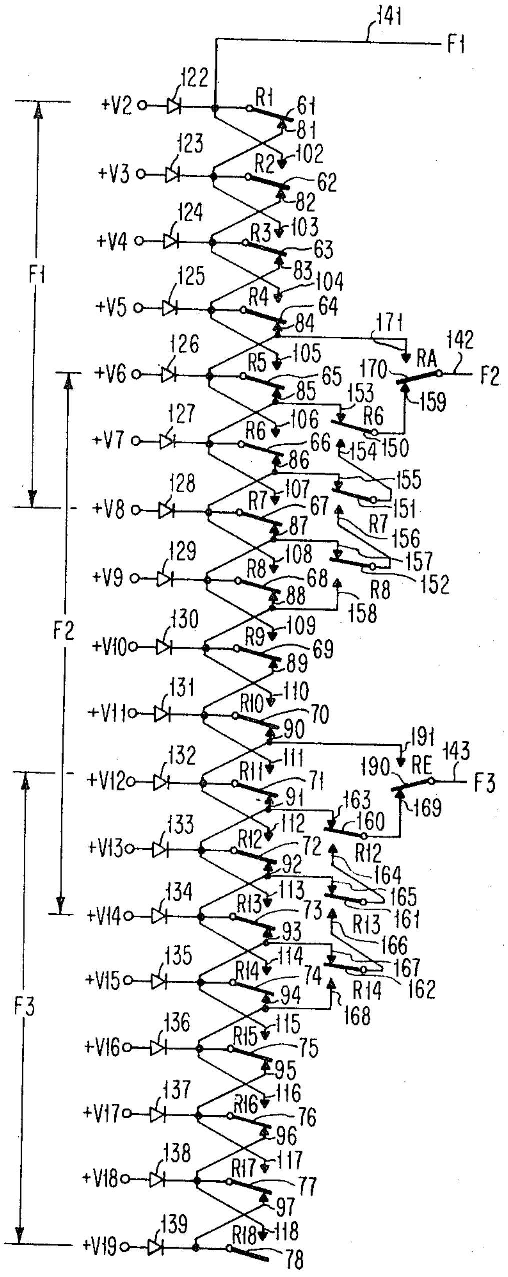

Referring to FIG. 2, a number of the contact points associated with the relay coils of FIG. 1 are depicted. In the example shown, eighteen relays R1 through R18 are shown, corresponding to comparison between nineteen frequency ranges. The selection of nineteen frequency ranges is entirely arbitrary and any desired number may be used without departing from the scope of the invention.

Common contact points 61 through 78 are arranged in linear fashion directly corresponding to the corresponding relay coils 51 through 57. The common points are shown in their normally down or drop position. In this position the common points are in electrical contact with stationary contact points 81 through 97. Upon operation or pick of a relay coil, the associated relay common is operated upward into electrical contact with a stationary contact point. These contact points are depicted as contacts 102 through 118.

Since, as described above, the relay coils corresponding to frequency comparisons immediately below a formant frequency, where the energy is increasing with frequency, are picked and those corresponding to frequency comparisons after the formant, where energy is decreasing with frequency, are dropped. Thus, the common contact points 61 through 78 of those relay coils which are picked are in contact with the upper set of contact points 102 through 118; and, the common contact points of relays which are dropped are in contact with the lower set of contact points 81 through 97.

Therefore, those relay points immediately preceding the formant frequency are in contact with the upper set of contact points and those relay points subsequent to a formant frequency are in contact with the lower set of contact points.

A voltage source V2 is connected via diode 122 to common contact point 61 and voltage sources V3 through V19 are connected via diodes 123 through 139 to common contact points 62 through 78. As an example wherein the individual voltages are easily identified, the voltage steps between the voltage potentials shown may be in the order of one volt. Therefore, V2 is one volt, V3 is two volts, etc.

The diodes 121 through 139 protect each voltage supply from higher voltages which may be impressed upon the associated upper contact point.

The voltage potentials V2 through V19 shown correspond to the frequency ranges of the associated filtering means 11 through 19. Thus, V2 represents $f2$, V3 represents $f3$, etc.

For the purpose of illustration, the maximum traversal of the first formant frequency, designated F1, to be expected, perhaps with some safety factor, may be frequencies $f2$ through $f8$. This is represented by voltage sources V2 through V8. Similarly, the maximum traversal of formant No. 2, F2, is chosen to be from frequency $f6$ through $f14$, as represented by voltage potentials V6 through V14; and the frequency range for the third formant, F3, is chosen to be from $f12$ through $f19$, represented by voltage potentials V12 through V19.

Referring to FIG. 2 and FIGS. 3A through 3E, the logic circuitry therein illustrated is arranged to provide the voltage potential representing the frequency of the first formant, F1, on line 141, the voltage potential designating the second formant, F2, on line 142, and the voltage potential indicative of the frequency of the third formant, F3, on line 143.

To this end, common contact points 61 through 78 and stationary contact points 81 through 97 and 102 through 118 are arranged to provide groupings of relay commons so that a common voltage potential is applied to the commons of all relays in a single group. That voltage is the highest potential connected to that group and comprises the voltage representative of the formant frequency for that group.

As described above, the relay commons immediately preceding the first formant frequency are connected to the upper contact points and at least one of the commons immediately succeeding the formant frequency is connected to the lower contact points. In this manner, those commons of the picked relays are connected to the preceding relay's common via the upper stationary contacts; and those of dropped relays are connected to the succeeding relay's common via the lower stationary contacts.

By this means, the groupings are split whenever a relay is picked and the next following relay is dropped. The output voltage is therefore that of the common of the last relay picked, representing the highest frequency in the group, since its common is connected to all preceding commons and the voltage impressed upon its common is dominant thereover so as to impress its voltage upon the entire group. This is because the lower voltage diodes are back biased and thus appear as open circuits.

For example, assume that the first formant, F1, is present at frequency $f3$. Referring additionally to FIG. 1, the output of frequency detector 13 is greater than that of either frequency detector 12 or 14. Therefore, comparator 22 provides an output, picking relay 52 (R2) while comparator 23 provides no output, dropping relay 53 (R3).

Referring to FIG. 2, the picking of relay R2 puts common contact point 62 in electrical contact with upper stationary contact point 102, while the dropping of relay R3 puts common contact point 63 in electrical contact with lower stationary contact point 83. The transition, therefore, between the on and off relays occurs between relay R2 and relay R3, indicating that the first formant is at $f3$.

The voltage potential V3 is therefore connected through diode 123, common contact 62 of relay R2, stationary contact 102, and common contact 61 of relay R1 to output line 141. Voltage potential V4, on the other hand, is not connected in any way to common contact 62. Therefore, voltage potential V3 is connected to the commons of all preceding relays (R2 and R1) and is dominant over the voltage potential connected thereto and is supplied on output line 141, representing the frequency $f3$ which is the frequency of the first formant.

In the same example, the second formant frequency, F2, may be at frequency $f7$. Therefore, relays R3 and R4 are dropped, relays R5 and R6 are picked and relay R7 is dropped. This causes voltage potential V7 to be impressed on the commons for the entire grouping between the first break at V3 and the second break at V7.

Specifically, voltage potential V7 is impressed on common contact 66, upper stationary contact 106, common contact 65, upper contact 105, common contact 64, bottom contact 84, bottom contact 83 and common contact 63. The common voltage potential of V7 therefore overrides the other potentials of the group and it is transmitted, as will be explained hereinafter, onto line 142. Due to the break at potential V3, the potential V7 is blocked from appearing on line 141.

Therefore, line 141 contains the voltage potential V3 representing the appearance of the first formant of frequency $f3$, and line 142 contains the voltage potential V7 representing the second formant frequency at frequency $f7$.

If a third formant frequency, F3, is present in the voice signal, the voltage potential representing the frequency of that formant would likewise cause a grouping such that the potential appeared on line 143.

The remainder of the logic circuitry shown in FIG. 2 and FIGS. 3A–3E comprise the logic for transmitting the potentials for the various groups of contacts to the proper output lines.

For example, the first formant frequency, F1, might appear at frequency $f8$. The described logic circuitry determines that this is so and prevents the voltage potential V8 from appearing on output line 142.

The need for such circuitry is caused by the overlap between formants F1 and F2 and between formants F2 and F3. Without such overlap, the output lines 141, 142 and 143 would merely be connected to the highest voltage point in each range traversed by a formant and no connection would be made between ranges.

Auxiliary common contacts 150, 151 and 152 are operated respectively by relays R6, R7 and R8. These common contacts together with stationary contacts 153 through 158 connect contact 159 to the second formant grouping if the first formant, F1, lies within the overlap area comprising frequency ranges $f6$ through $f8$.

For example, if the first formant lies at frequency $f7$, relay R6 is picked and relay R7 is dropped. The splitting of groups therefore occurs between voltage potentials V7 and V8 in that common contact 66 transmits the voltage V7 through upper stationary contact 106 to the group for formant F1 and common contact 67 joins voltage potential V8 through bottom stationary contact 87 to the second formant group.

Since the voltage V7 belongs to the first formant grouping, it is necessary to prevent the transmission of this voltage to output 142, and to connect output 142 to the second formant grouping. Therefore, the picking of relay R6 causes common contact 150 to move out of contact with stationary contact points 153 and into contact with stationary contact points 154. Therefore, contact 159 is connected via common 150 and stationary contact 154 to common 151 of relay R7. This relay is dropped and therefore connects contact 159 to the linear relay array beginning with voltage V8 and prevents its contact with any voltage of the first formant group. The voltage of the second formant is therefore transmitted up the array to common contact 67, stationary contact 86, stationary contact 155, common contact 151, stationary contact 154 and common contact 150 to contact 159.

The logical network comprising auxiliary common contact points 160, 161 and 162 associated with relays R12, R13 and R14, together with contacts 163 through 168 are arranged identically to the network comprising numerals 150 through 158 as described above and serve to connect contact 169 to the grouping of commons comprising the third formant when the second formant lies within the overlap comprising frequency ranges *f*12 through *f*14.

Figure 3A:
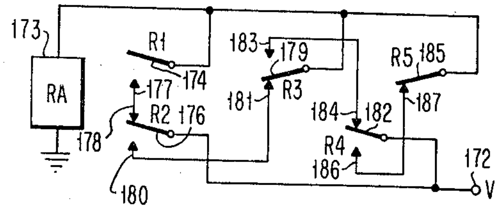

Common contact 170 of relay RA of FIG. 3A disconnects, when the relay is picked, the logical network comprising contacts 150 through 159 from output line 142 if the first formant occurs in the frequency range of *f*1 through *f*5, which is not within the overlap area. The picking of relay RA causes common contact 170 to connect output 142 through stationary contact 171 to stationary contact 84 and common contact 65, which comprises the lowest voltage point in the range traversed by formant F2. The remainder of the network comprising relays R5 through R13 then detects formant F2 identically to that of relays R1 through R7 in detecting formant F1, previously described.

The determination whether the first formant is situated within the frequency range of *f*1 through *f*5, and therefore outside the overlap area, is the function of the logical network shown in FIG. 3A.

The logical equation for a network of FIG. 3A is $$A=(R1\cdot\overline{R2})+(R2\cdot\overline{R3})+(R3\cdot\overline{R4})+(R4\cdot\overline{R5}).$$

The network therefore detects whether a split between groupings appears anywhere before the F1–F2 overlap. This split is detected by testing each set of adjacent relays to determine whether the first relay is picked and the second relay is dropped. Should this occur, a split is indicated and relay RA picked.

Relay RA is picked by connecting the voltage potential from terminal 172 to the relay coil 173.

In accordance with the above equation, common contacts 174 and 176 and stationary contacts 177 and 178 comprise the portion of the equation "$R1\cdot\overline{R2}$." Thus, if the first formant is at frequency *f*2, relay R1 is picked, connecting common contact 174 to stationary contact 177, and relay R2 is dropped, connecting common contact 176 to stationary contact 178. The voltage from source 172 is therefore transmitted through these connections to operate relay coil 173 picking relay RA.

Similarly, common contacts 176 and 179 and stationary contacts 180 and 181 comprise the portion of the equation "$R2\cdot\overline{R3}$." If the first formant appears at frequency *f*3, relay R2 is therefore picked and relay R3 dropped so that the connection is made from terminal 172 via common contact 176, stationary contact 180, stationary contact 181 and common contact 179 to pick relay RA.

Likewise, common contacts 179 and 182 and stationary contacts 183 and 184 comprise the portion of the equation "$R3\cdot\overline{R4}$" to thereby connect the positive potential at terminal 172 to relay coil 173 when the first formant appears at frequency *f*4.

The remainder of the equation, "$R4\cdot\overline{R5}$," is represented by common contacts 182 and 185 and stationary contacts 186 and 187. These contacts connect the positive potential to pick relay RA when the first formant is at frequency *f*5.

Therefore, if the first formant frequency appears in the frequency range of *f*1 through *f*5, relay RA is picked to connect output 142 to stationary contact 171 and common contact 65. If, however, the first formant appears in the F1–F2 overlap frequency range of *f*6 through *f*8, relay RA is therefore dropped and connects output 142 to stationary contact 159 and the relay network comprising contacts 150 through 158, previously described.

Thus, relay RA is picked if the first formant, F1, lies in the "only F1" range comprising frequencies *f*1 through *f*5, and is dropped if formant F1 is outside the only F1 range.

Similarly, auxiliary relay RE is picked, thereby connecting common contact 190 to stationary contact 191 whenever formant F2 occurs at a frequency below the F2–F3 overlap. Thus, if the second formant F2 appears in the range of frequencies *f*6 through *f*11, relay RE is picked and, if formant F2 appears in the frequency range of *f*12 through *f*14, relay RE is dropped, connecting output line 143 to common contact 169.

Determining whether formant F2 lies within the range of frequencies *f*6 through *f*11 is more complex than the determination above that formant F1 lies within the frequency range of *f*1 through *f*5. Formant F2 occurs in the frequency range *f*6 through *f*11 (1) if a formant occurs in the "only F2" range comprising frequencies *f*9 through *f*11; (2) if two formants appear in the gap F1–F2 overlap comprising the frequencies *f*6 through *f*8; or (3) if a formant appears in the only F1 range comprising frequencies *f*1 through *f*5 and a formant occurs in the F1–F2 overlap.

Figure 3B:
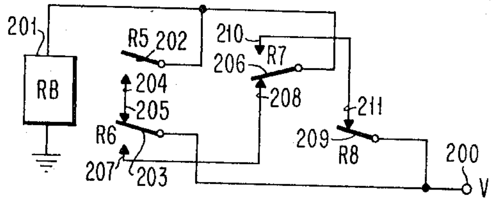
Figure 3C:
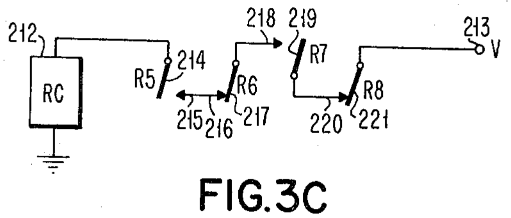
Figure 3D:
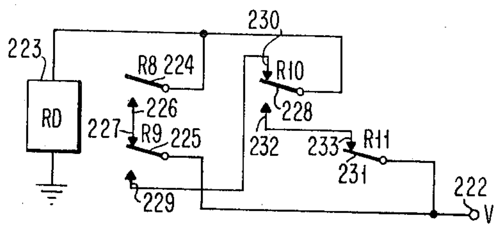
Figure 3E:
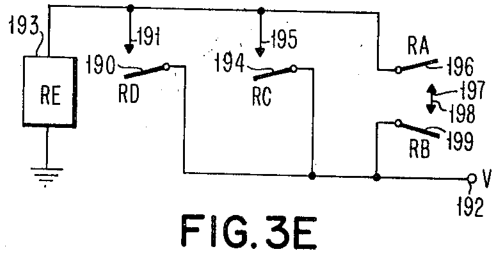

Referring to FIG. 3E, the above statement is embodied in the logical network of FIG. 3E and expressed by the equation $E=RD+RC+(RA\cdot RB)$.

Thus, if a formant occurs in the only F2 range, relay RD picks so that its common 200 connects to stationary contact 201 to transmit the positive voltage potential from terminal 202 to the relay coil 203 of relay RE. Likewise, if two formants appear in the F1–F2 overlap, relay RC is picked and its common 204 connects to stationary contact 205 and supplies the potential to the relay coil 203.

If a formant appears in the only F1 range, the circuit of FIG. 3A picks relay RA, as described above, and thereby connects common 206 to stationary contact 207. If, at the same time, a formant occurs in the F1–F2 overlap, relay RB is picked connecting common contact 208 to stationary contact 209. The potential from terminal 202 is thereby supplied via common contact 209, stationary contact 208, stationary contact 207 and common contact 206 to operate relay coil 203, picking relay RE.

FIGS. 3B, 3C and 3D show the logical circuitry necessary for operating relays RB, RC and RD.

As mentioned above, relay RB detects a formant in the F1–F2 overlap comprising frequencies *f*6, *f*7 and *f*8. Similar to the logic of FIG. 3A, the detection of a formant in the F1–F2 overlap comprises the detection of the break between groups wherein one relay is picked and the immediately subsequent relay is dropped. To this end, the logical equation for the detection of a formant in the F1–F2 overlap comprises $$B=(R5\cdot\overline{R6})+(R6\cdot\overline{R7})+(R7\cdot\overline{R8}).$$

The logical circuitry of FIG. 3B embodies the above equation to selectively supply the voltage potential from terminal 200 to relay coil 201, thereby operating relay RB. The portion of the equation compirsing $R5\cdot\overline{R6}$ is embodied in common contacts 202 and 203 and stationary contacts 204 and 205. Thus, if relay R5 is picked and relay R6 is dropped, the voltage potential is transmitted to pick relay RB. Likewise, the portion of the equation $R6\cdot\overline{R7}$ comprises common contacts 203 and 206 and stationary contacts 207 and 208, whereby the picking of relay R6 and the dropping of relay R7 connects the voltage potential from terminal 200 to the relay coil 201.

Similarly, common contacts 206 and 209 and stationary contacts 210 and 211 comprise the portion of the equation $R7\cdot\overline{R8}$. Thus, the picking of relay R7 and dropping of relay R8 causes the above contacts to supply the potential from terminal 200 to relay coil 201 picking relay RB.

Thus, the appearance of a formant in the F1–F2 overlap picks relay RB, connecting, in FIG. 3E, common contact 209 to stationary contact 208.

Referring to FIG. 3C, the relay coil 212 of relay RC is operated if two formants are present in the F1–F2 overlap. The only way for two formants to appear in the overlap is for the formant F1 to be at frequency $f6$ and for the second formant, F2, to be at the frequency range $f8$, or vice versa. If one formant is at frequency $f6$, relay R5 is picked and relay R6 is dropped and if a second formant is at frequency $f8$, relay R7 is picked and relay R8 is dropped.

The corresponding equation is $C{-}R5\cdot\overline{R6}\cdot R7\cdot\overline{R8}$. The logic comprising this equation is accomplished through the sequential array of contacts between voltage source 213 and coil 212 comprising common contact 214 of relay R5, stationary contact 215, stationary contact 216, common contact 217 of relay R6, stationary contact 218, common contact 219 of relay R7, stationary contact 220 and common contact 221 of relay R8. Thus, if two formants lie in the F1–F2 overlap, relay R5 is picked connecting common contact 214 to stationary contact 215; relay R6 is dropped, connecting common contact 217 to stationary contact 216; relay R7 is picked connecting common contact 219 to stationary contact 218; and relay R8 is dropped connecting common contact 221 to stationary contact 220. The voltage potential at terminal 213 is therefore gated therethrough to operate relay coil 212, picking relay RC.

Relay RC is therefore picked if one formant is at frequency $f6$ and another at frequency $f8$, there being two formants in the frequency range comprising the F1–F2 overlap. The picking of relay RC thereby closes, in FIG. 3E, common contact 194 with stationary contact 195 to thereby operate relay RE.

Referring to FIG. 3D, relay RD is operated if a formant occurs in the "only F2" frequency range. As with respect to the logic circuitry of FIGS. 3A and 3B, the appearance of a formant in the only F2 frequency range is indicated by a split between groupings anywhere within that range. This split is therefore detected by testing each set of adjacent relays within the range to determine whether the first relay is picked and the second relay is dropped. Should this occur, a split is indicated and relay RD picked by connecting the voltage potential from terminal 222 to the relay coil 223.

To detect such a split, the equation for the network of FIG. 3D is therefore $$D=(R8\cdot\overline{R9})+(R9\cdot\overline{R10})+(R10\cdot\overline{R11}).$$

With respect to the above equation, common contacts 224 and 225 and stationary contacts 226 and 227 comprise the first portion of the equation, "$R8\cdot\overline{R9}$," by connecting the voltage potential to relay coil 223 if relay R8 is picked and relay R9 is dropped.

Common contact 225, relay R9 and common contact 228 of relay R10 together with stationary contacts 229 and 230 comprise the "$R9\cdot\overline{R10}$" portion of the above equation. Thus, when a formant appears at frequency $f9$, relay R9 is picked and relay R10 is dropped to thereby transmit the voltage potential from terminal 222 to operate relay RD.

Likewise, the portion of the above equation "$R10\cdot\overline{R11}$" is embodied in common contacts 228 and 231 and stationary contacts 232 and 233. Therefore, upon relay R10 being picked and relay R11 being dropped, indicating that a formant is at frequency $f10$, the circuitry operates relay RD.

The above circuitry has been discussed with respect to relays because the logical arrangement of relays is the easiest to follow and to demonstrate the invention. Further, relays operate at speeds that are appropriate to that of voice recognition and are easy to install and operate. However, it is contemplated that other switching circuits may be utilized in place of the above relays and operate similarly thereto. Examples of such switching circuits are shown in Principles of Transistor Circuits, Richard F. Shea, et al., John Wiley and Sons, Inc. New York, 1953, on pages 421–435.

The use of electronic, transistor, or integrated switching circuits, which operate at speeds greater than that of relays, allows the circuitry of the invention to be used to analyze complex signals that change at higher rates than voice signals.

For the purpose of illustration, the operation of the illustrated embodiment of the invention with respect to two examples of complex voice signals will be discussed.

In the first example, referring to FIG. 1, assume that a complex voice signal having formants of frequencies $f3$, $f7$ and $f17$ is provided at input 10. The voltage outputs of the frequency detectors 11–19 therefore show increasing voltages from frequencies $f1$ to $f3$, decreasing energies from frequencies $f3$ to $f5$, increasing voltages from frequencies $f5$ to $f7$, decreasing voltages from frequencies $f7$ to $f12$, increasing voltages from frequency $f12$ to frequency $f17$, and decreasing voltages from frequencies $f17$ to $f19$, assuming that only nineteen frequency detectors are provided.

When the voltage increases from the lower frequency detector to the adjacent higher frequency detector, the associated one of comparators 21–27 is turned on, operating the associated one of relays 51–57, and, where the voltage decreases, the comparator remains off, dropping the relay. Thus, comparators 21 and 22 are on and relays 51 and 52 picked; comparators 23 and 24 are off and relays 53 and 54 are dropped; comparators 25 and 26 are on and relays 55 and 56 picked; etc.

Referring to FIG. 2, the commons 61 and 62 of relays R1 and R2 are therefore up and commons 63 and 64 of relays R3 and R4 are down, etc. Therefore, the splits between groups occur between voltages V3 and V4, between voltages V7 and V8, and between voltages V17 and V18.

As a result of the split between voltages V3 and V4, voltage V3 is supplied via common contact 62 of relay R2, stationary contact 102, and common contact 61 to output 141 thereby designating that the first formant F1 is that of frequency $f3$.

Referring to FIG. 3A, the fact that relay R2 is picked and relay R3 dropped causes the voltage from terminal 172 to be transmitted via common contact 176 of relay R2, stationary contact 180, stationary contact 181 and common contact 179 of relay R3 to thereby pick relay RA. This indicates that a formant is present in the "only F1" frequency range and that, therefore, the second formant, F2, may occur at any frequency following the only F1 range. Therefore, relay RA connects output 142 to the diode 126 of the voltage V6 representing the lowest frequency in the F2 range.

The split occurring after voltage V7, due to relay R6 being picked and relay R7 dropped, causes the voltage V7 to be transmitted via common contact 66 of relay R6, stationary contact 106, stationary contact 171 and common contact 170 of relay RA to output line 142. The voltage V7 on line 142 thereby represents the frequency $f7$ of the second formant.

Referring now to FIG. 3B, relay R6 is picked, connecting common 203 to stationary contact 207, and relay R7 is dropped, connecting common 206 to stationary contact 208. Therefore, the voltage potential of terminal 200 is transmitted therethrough to operate coil 201 of relay RB. This indicates that a formant is present in the F1–F2 overlap.

Referring to FIG. 3E, relay RA has been picked since a formant is present in the only F1 range and relay RB picked because a formant is present in the F1–F2 overlap. Therefore, the voltage from terminal 192 is transmitted via common contact 199 of relay RB, stationary contact 198, stationary contact 197 and common contact 196 of relay RA to operate coil 193 of relay RE.

Referring to FIG. 2, common contact 190 of relay RE thereby connects output 143 to the diode 132 of voltage V12, representing the lowest frequency in the F3 range.

The split between groups occurring after voltage V17, due to relay R16 being picked and relay R17 dropped, causes the voltage V17 to be transmitted via the common contacts 76–72 and the respective upper stationary contacts 116–112 of relays R16–R12, all of which are picked; and directly through contact 90, stationary contact 191 and common contact 190 to output line 143. The voltage V17 thereby represents on output line 143 frequency *f17* of the third formant.

Referring to FIGS. 1 and 2, the second example of a voice signal is assumed to comprise formants of frequencies *f6*, *f14* and *f18*. The operation of the comparators and relays of FIG. 1 therefore provide splits between formant groups immediately after frequency range *f6*, caused by relay R5 being picked and relay R6 being dropped; immediately after frequency *f14* caused by relay R13 being picked and relay R14 dropped; and immediately after frequency *f18* due to relay R17 being picked and relay R18 dropped.

The voltage V6 is therefore transmitted through commons 65–62 and respective upper stationary contacts 105–102 to output line 141 since relays R5–R1 are picked. The voltage V6 therefore represents the frequency *f6* of the first formant.

Referring additionally to FIG. 3A, no formant is in the "only F1" frequency range so that relay RA is not operated and therefore connects output line 142 to stationary contact 159. Also, since relay R6 is dropped, its common 150 connects stationary contact 159 through stationary contact 153 to diode 127 of voltage potential V7. Since relay R13 is picked and relay R14 dropped, the voltage V14 therefore is transmitted via commons 73–70 and stationary contacts 113–110 of relays R13–R10, all of which are picked, and stationary contacts 89–86 and commons 69–66 of relays R9–R6, all of which are dropped, to be connected through stationary contact 153, common contact 150, stationary contact 159 and common contact 170 to output line 142. The voltage V14 appearing on line 142 therefore represents the frequency *f14* of the second formant.

Referring additionally to FIGS. 3A–D, no formant appears in the only F1 range so that relay RA is dropped. Further, relay RC is dropped since two formants do not appear in the F1–F2 overlap, and relay RD is also dropped because no formant appears in the "only F2" range. Therefore, only relay RB is operated due to the signal formant in the F1–F2 overlap.

Referring to FIG. 3E, only the common contact 199 of relay RB is closed with the stationary contact 198, and all other commons are open. Therefore, no voltage is transmitted to coil 193 of relay RE and the relay is dropped.

Referring now to FIG. 2, the operation of relay RE causes common 190 to be connected to stationary contact 169. Relays R12–R14 are all picked. Therefore, output 143 is connected via common contacts 190, 160, 161 and 162, and stationary contacts 169, 164, 166 and 168 to diode 136 of voltage V16.

The split at the end of the third formant group, however, appears after frequency *f18* since relay R17 is picked and relay R18 dropped. Also, relay R15 is dropped and relay R16 picked. Therefore, voltage V18 is transmitted via common contact 77, stationary contact 117, common contact 76 and stationary contact 116 to stationary contacts 94 and 168, thereby transmitting voltage V18 to output 143.

The voltage V18 appearing on line 143 represents the frequency *f18* of the third formant.

The above examples illustrate operation of the invention with respect to the relay embodiment shown and will produce the same results when utilized with other switching networks discussed above, when arranged in accordance with the present invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A frequency analyzer comprising:
- an input;
- a plurality of frequency detectors connected to said input, each being responsive to a selected one of a plurality of distinct frequency bands to provide an output signal, the amplitude of which is representative of the energy of the selected frequency band;
- a plurality of comparators, each connected to outputs of two of said frequency detectors which scan adjacent frequency ranges, said comparators being responsive to said outputs and selecting the frequencies having maximum energy peaks;
- a plurality of switching means each having two states, each said switching means connected to an output of one of said comparators and operated by said comparator;
- circuit connections providing an operative connection between a switching means and its preceding switching means when said switching means is in its first state and an operative connection to its succeeding switching means when said switching means is in its second state, said switching means being connected in groups, said groups being split when a switching means in the first state is next followed by a switching means in the second state, each of said groups representing one of the maximum energy peaks in the frequency spectrum being analyzed.

2. A frequency analyzer in accordance with claim 1, further comprising:
- logic means operated by certain ones of said comparators for determining which of said groups of said switching means represent selected energy peaks.

3. A system for analyzing a continuous frequency spectrum, comprising:
- an input;
- a bank of frequency detectors connected to said input, each responsive to a selected one of a plurality of sequentially arranged frequency bands of said spectrum to provide an output signal representative of the instantaneous energy within said selected frequency band;
- a plurality of comparators, each connected to the outputs of a pair of frequency detectors of adjacent frequency bands for detecting when the frequency detector of the higher frequency has an output signal indicating a greater energy than the frequency detector of the lower frequency;
- a plurality of switching means being in either a first or a second state, said first state being operated and said second state being unoperated, each of said switching means connected to an output of one of said comparators and operated when said comparator makes said detection;
- a plurality of voltage sources having sequentially arranged, detectably different voltages, each connected to a terminal of an associated one of said switching means; and
- circuit connections to said switching means for connecting its associated voltage source to the preceding switching means when said switching means is in its operated state and to the succeeding switching means when said switching means is in its unoperated state, whereby the highest voltage in a group of so connected switching means is impressed on all the switching means of that group and is representative of the frequency detector having the highest frequency in that group.

4. A system for analyzing a continuous energy spectrum in accordance with claim 3 further including:
- logic means operated by certain ones of said comparators, said logic means being determinative of which of said groups of said switching means represents the lowest, middle and highest frequency energy peaks;

first, second and third output lines connected to certain ones of said circuit connections and being preassigned to give an indication of the voltage impressed on said groups of switching means representing the lowest, middle and highest frequency energy peaks, respectively.

5. A system for analyzing a continuous frequency spectrum in accordance with claim 4, wherein:

said bank of frequency detectors is arranged sequentially to detect immediately adjacent frequency bands, and said bank of detectors is divided into first, second and third partially overlapping subbanks which are responsive to the lowest, middle and highest frequency energy peaks, respectively; and said logic means includes:

a first logic network for determining whether said lowest energy peak appears in the nonoverlapping portion of the first said subbank of frequency detectors;

a second logic network for determining whether an energy peak appears on one of said frequency detectors which comprise the overlap region between said first and second subbanks;

a third logic network for determining whether both the lowest and middle energy peaks appear on two of said detectors which comprise the overlap region between said first and second subbanks;

a fourth logic network for determining whether the middle energy peak appears in the nonoverlapping portion of said second subbank of frequency detectors; and a fifth logic network for determining whether the middle energy peak appears on one of said frequency detectors which comprise the overlap region between said second and third subbanks;

said logic means directing each of said voltages to the proper output line.

References Cited

UNITED STATES PATENTS

| | | |
|---|---|---|
| 3,196,212 | 7/1965 | Horwitz et al. |
| 3,215,934 | 11/1965 | Sallen. |
| 3,296,374 | 1/1967 | Clapper. |
| 3,327,058 | 6/1967 | Coker. |

RUDOLPH V. ROLINEC, *Primary Examiner.*

P. F. WILLE, *Assistant Examiner.*

U.S. Cl. X.R.

179—1